United States Patent Office 3,592,826
Patented July 13, 1971

---

3,592,826
IMIDAZOLE CATALYSTS FOR DIKETENE REACTIONS
Erich Marcus, Charleston, and John Kai-Fai Chan, South Charleston, W. Va., assignors to Union Carbide Corporation
No Drawing. Filed May 22, 1967, Ser. No. 640,363
Int. Cl. C07d 7/16
U.S. Cl. 260—343.5      13 Claims

ABSTRACT OF THE DISCLOSURE

Imidazole catalyzed reactions for the production of dehydroacetic acid, 2,4,6-heptanetrione and 2,6-dimethyl-4-pyranone from diketene are disclosed.
The examples illustrate the use of 1-methylimidazole; 1-ethylimidazole; 1-isopropylimidazole; 1-octylimidazole; 1,2-dimethylimidazole; 1,2-diethyl-4-methylimidazole to catalyze the reactions.

---

Dehydroacetic acid can be prepared by the dimerization of diketene in an inert solvent in the presence of a catalyst and may be illustrated by the following reaction:

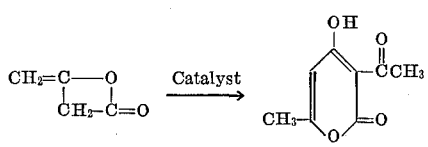

A number of catalysts such as tertiary amines, sodium phenoxides, sodium alkoxides, and sodium acetate have been proposed for the reaction. In using these conventional catalysts, it has been observed that the product produced is usually contaminated with a large amount of impurities, which make it almost impossible to purify the desired product by inexpensive means. As an example when dehydroacetic acid is prepared by the dimerization of diketene in the presence of trimethylamine according to U.S. Pat. 2,849,456 impurities are produced that yields a sodium salt of yellow or orange color and which is also highly insoluble in known solvents and, cannot, be separated from dehydroacetic acid by recrystallization.

These impurities have now been identified as the tetramers and pentamer of diketene and are formed according to the following condensation reactions which also take place during the conversion of diketene to dehydroacetic acid under certain conditions:

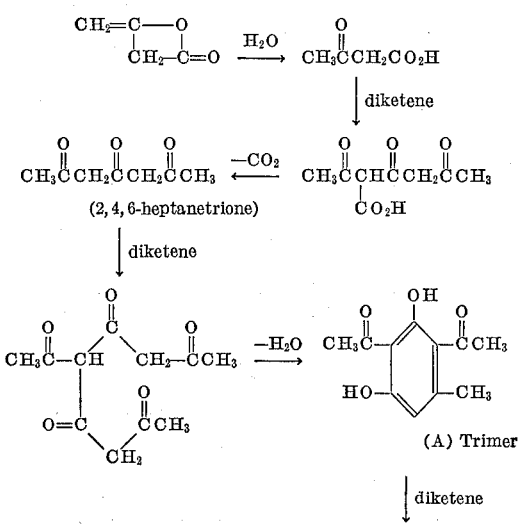

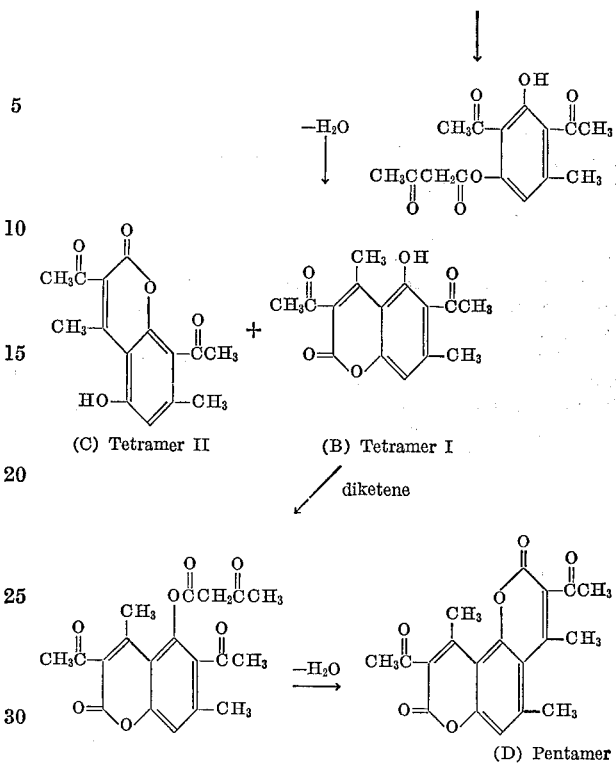

The expression "trimer," "tetramers" and "pentamer" as used herein are intended to relate to compounds of the structure A, B, C and D as given above. The formation of the pentamer and two tetramers is undesirable for several reasons, one of which is the reduced yield of dehydroacetic acid. Additionally, once the impurities are precipitated from the mother-liquor together with dehydroacetic acid, pure dehydroacetic acid cannot be isolated by simple crystallization and recrystallization. An expensive codistillation with a high boiling solvent is necessary to obtain dehydroacetic acid of satisfactory quality. The difficulties encountered in the prior art, especially with regard to separations of impurities are further described in U.S. Pat. 2,553,292 and 2,997,482. In one prior art method of purification substantial decomposition occurs using a codistillation process, the decomposition also resulting in a further reduction of the acid yield. Additionally, dehydroacetic acid is sold as an alkali metal salt such as the sodium salt which is white in color. The sodium salts of the two tetramers and the pentamer form deep yellow compounds and consequently their presence makes it nearly impossible to obtain sodium dehydroacetate of satisfactory color.

Since both the tetramers and pentamer tend to build up in time as by-products in the mother-liquor in which the dehydroacetic acid is produced, it is substantially impossible to recycle or re-use the mother-liquor containing diketene and other non-deleterious by-products since the increasing concentration of tetramers and pentamer in the mother-liquor greatly increase the likelihood of subsequent contamination of dehydroacetic acid. Accordingly, a continuous commercial process for the manufacture of dehydroacetic acid employing a crystallization step for separating the acid is not possible since the liquor will always contain tetramers and pentamers as impurities along with trimers that will be subsequently converted to tetramers and pentamer. Consequently the mother-liquor, if recycled in a continuous process will undergo an incremental build-up of these impurities which increases the likelihood of contaminating the acid during separation by crystallization and recrystallization. For the same reasons recovery of pure dehydroacetic acid is not possible by evaporation of the mother-liquor or by processes in which second and third crop crystals are obtained from the mother-liquor.

It is therefore an object of the present invention to overcome these and other difficulties encountered in the prior art.

The present invention is directed to these ends and in its broadest aspect relates to a novel method for the conversion of diketene to dehydroacetic acid 2,4,6-heptanetrione and 2,6-dimethyl-4-pyranone in which an imidazole, especially a 1-alkylimidazole is employed as a catalyst. Another aspect of the invention comprises the conversion of diketene to dehydroacetic acid in a solvent by means of an imidazole catalyst whereby the tetramers or pentamer impurities produced as a by-product of the dimerization are substantially reduced or eliminated. It is another object of this invention to provide a catalyst useful for the production of dehydroacetic acid from diketene in high yields.

According to the present invention, when the imidazole catalyst is used in a process employing a solvent as a reaction medium, crystallization, centrifugation or filtration can be used to obtain high purity dehydroacetic acid directly in high yields, and the mother-liquor which also contains some acid can be recycled to the reaction mass along with diketene and the imidazole catalyst or the acid may be separated by crystallization. This recycling step can be employed either in a batch or a continuous process. The present invention also relates to a method that permits recovery of second and third crop crystals of dehydroacetic acid.

Because recycling of mother-liquor is now possible the present invention also affords certain economic advantages in the recovery of residual dehydroacetic acid from a mother-liquor. Prior to the present invention it was not possible to recycle or re-use the mother-liquor containing some residual dehydroacetic acid after the first separation, since a relatively greater quantity of trimers, tetramers and pentamer impurities would also be recycled thereby resulting in the production of acid with succeedingly higher quantities of impurities i.e. recycled dehydroacetic acid would contain some partially separated trimers, tetramers and pentamer impurities obtained from the previous recovery resulting in a build-up of impurities in each separation and additionally new impurities would be formed in each cycle by the further conversion of the trimer to tetramers and pentamer. Stated otherwise, the subsequent re-use of mother-liquor containing unrecoverd dehydroacetic acid obtained by prior art methods resulted in the production of increasingly impure acid since the ratio of impurities to unrecovered acid increased during the recycle operation and this increased ratio caused greater quantities of tetramers and pentamer to be separated with the dehydroacetic acid. These difficulties have been overcome by the present invention since the alkylimidazoles eliminates or substantially reduces the formation of the tetramers and pentamer.

In another aspect of the present invention and as an alternate to recycling the mother-liquor it is now for the foregoing reasons not only possible to collect a first crop of a high-quality product, but also a second and sometimes a third crop of good purity can be obtained simply by evaporation of solvent from the mother-liquor, when the mother-liquor is not recycled to the reactants. The subsequent recovery of second crop and third crop dehydroacetic acid produced by prior art methods which resulted in the production of increasingly impure acids can now be avoided or minimized since the increase in the ratio of impurities to unrecovered acid with each separation has been substantially reduced or eliminated when dehydroacetic acid is produced using the catalysts of the present invention.

A material which has been produced in either fashion can be converted into a white or nearly white colored sodium salt of dehydroacetic acid. When dehydroacetic acid has been made by dimerization of diketene in the presence of other tertiary amine catalysts according to procedures known in the art, even the first crop of dehydroacetic acid is usually converted into a sodium salt of orange color. Since the formation of impurities rendering a yellow or orange-colored salt is eliminated or occurs only to a negligible extent when 1-alkylimidazoles are used as catalysts, the mother-liquor can be used over again repeatedly without further purification.

A further aspect of the invention relates to the discovery that when the catalysts of the present invention are employed with a solvent comprising a ketone containing from three up to about ten carbon atoms and a hydrocarbon normally liquid at about room temperature (20° C.) and having from about five up to about ten carbon atoms and various mixture thereof, increased yields of dehydroacetic acid may be obtained.

The present invention also relates to a method for manufacturing 2,4,6-heptanetrione (diacetylacetone) and 2,6-dimethylpyranone from diketene and water employing the novel catalysts described herein. These compounds are formed by adding diketene to water containing the catalyst and the time of reaction adjusted so that the reaction is stopped when carbon dioxide is no longer given off as a by-product. The amount of water may vary anywhere from about 0.3 to about 0.9 mole per mole of diketene, more or less and may be readily determined by a person having ordinary skill in the art. A preferred quantity of water comprises from about 0.4 to about 0.6 mole per mole of diketene.

Although the inventors do not wish to be limited by any theory it is believed that by employing the catalyst of the present invention a means has been found for eliminating or substantially reducing the production of trimers, tetramers and pentamers of diketene according to the aforementioned reaction. These undesirable by-products are obtained when a tertiary amine catalyst is employed however the present imidazole catalysts although favoring the production of dehydroacetic acid, also tend to minimize or eliminate the formation of trimers, tetramers and pentamers. This is especially unexpected in view of the fact that similar heterocyclic nitrogen compounds such as pyridines and pyrroles exhibit a much reduced activity or no activity at all in the catalytic oligomerization of diketenes.

It may be theorized that dimerization of diketene leading to dehydroacetic acid with an amine catalysts proceeds as follows:

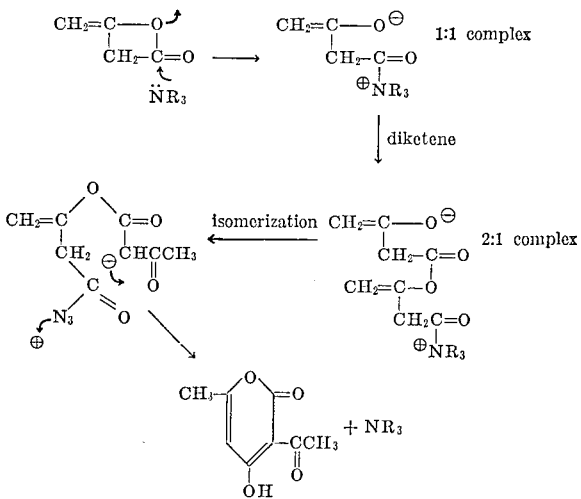

Thus in the absence of other nucleophiles the 1:1 complex can react with another mole of diketene to produce the 2:1 complex which can cyclize, expel the catalyst and form dehydroacetic acid, The condensation reactions which lead to the undesirable by-product tetramers and pentamers are also catalyzed by bases (bases towards protons) as is the diketene dimerization yielding dehydroacetic acid. Therefore it may be theorized that an ideal catalyst for the manufacture of dehydroacetic acid should be very nucleophilic with respect to diketene, but weakly basic with regard to the condensation reaction resulting in the formation of tetramers and pentamer. The tertiary amine catalysts of the prior art catalyze such condensation reactions; however, the imidazole heterocyclic nitrogen compounds of the present invention are believed to be so weakly basic with respect to these condensation reactions that the tetramers and pentamer are not formed or are substantially eliminated. The present catalysts also have the advantage that they are strongly nucleophilic with respect to diketene and favor the formation of dehydroacetic acid. The effect of the catalyst is also unexpected in view of the fact that one of the products obtained according to the method of the invention, 2,4,6-heptanetrione, is an intermediate in the formation of the tetramers and pentamer. The catalyst minimizes formation of these latter compounds and selectively effects the reaction of diketene and water to the trione.

In summary, the advantages of the invention can be obtained on a batch or continuous basis and the build-up of impurities in the reaction mass employing either method are substantially eliminated or greatly minimized when compared to the prior art. The quality of a material produced in this fashion remains high as compared to the case when a mother-liquor obtained from making dehydroacetic acid with an amine catalyst known in the art is used to make more dehydroacetic acid, whereby the quality of the product becomes rapidly poorer.

Thus when the catalysts of the present invention are employed, the formation of these undesirable impurities becomes negligible; a pure product can be isolated from the reaction mixture simply by crystallization, filtration or centrifugation followed by washing with a suitable solvent.

The 1-alkylimidazole catalyst generally comprises compounds represented by the following formula:

III
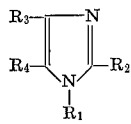

where $R_1$ is an alkyl, alkoxyalkyl, hydroxyalkyl, haloalkyl where the halogen is attached to the chains other than on a α carbon atom, acyloxyalkyl, alkynyl, alkenyl, or an aralkyl group, containing from one to about twenty carbon atoms, especially lower alkyl groups of one to about four carbon atoms, and preferably lower alkyl groups of one to about two carbon atoms. The radicals $R_2$, $R_3$, and $R_4$ are preferably hydrogen, although they can also be represented by the $R_1$ groups as described previously, especially the aforementioned alkyl groups and preferably the lower alkyl groups. Examples of catalysts that can be used are 1-methylimidazole, 1-ethylimidazole, 1-isopropylimidazole, 1-n-propylimidazole, 1-sec-butylimidazole, 1 - methoxymethylimidazole, 1 - (2-ethylhexyl)imidazole, 1-octylimidazole, 1-hexadecylimidazole, 1,2-dimethylimidazole, 1,2-diethyl-4-methylimidazole, 1,2,5-trimethylimidazole, 2-ethyl-1-methylimidazole, 2-ethyl-1,4-dimethylimidazole, and the like.

The reaction is preferably carried out in a solvent liquid medium employing times, temperatures and pressures or any combination thereof sufficient to produce from diketene, dehydroacetic acid, or from diketene and water, 2,6-dimethylpyranone and 2,4,6-heptanetrione. The reaction conditions are easily determined by a person having ordinary skill in the art.

As noted before the preferred solvent comprises a mixture of a ketone having from 3 to about 10 carbon atoms and a hydrocarbon having from about 5 to about 10 carbon atoms and comprises from about 30 to about 60 parts of ketone to about 40 to about 70 parts of hydrocarbon, preferably from about 35 to about 55 parts of ketone to about 45 to about 65 parts of hydrocarbon on a weight basis. Suitable ketones in this regard include acetone, methyl ethyl ketone, diisobutyl ketone, diisopropyl ketone, methylisobutyl ketone, cyclohexanone, and the like. Suitable hydrocarbons include, n-hexane, dimethylbutane, methylpentane, methylcyclopentane, heptane and its isomers, octane and its isomers, toluene, benzene, xylene, cumene and tetralin and any mixtures of said ketones and hydrocarbons. Preferred solvents comprise a 50:50 mixture of acetone and hexane or a 60:40 mixture of acetone and toluene on a weight basis including such mixtures where either component may vary about ±10%.

Selection of a pair or other combination of solvents taken from those specifically enumerated is based on low cost, solubility with regard to any impurities in the reaction, poor solubility with regard to dehydroacetic acid, good solubility with regard to diketene and generally inertness toward diketene.

Other solvents inert to diketene may also be useful for example, ethyl acetate, isopropyl ether and various combinations of such solvents. The amount of solvent preferred is about 50 to about 300 parts by volume per mole of diketene employed. The most preferred amount is about 100 to about 200 parts by volume for each mole of diketene used.

The preferred temperature range is about 0 to about 50° C.; the most preferred range is about 15 to about 35° C. Since the dimerization reaction is exothermic, it is necessary to provide suitable means to maintain the temperature in the desirable range. The reaction is conducted satisfactorily under atmospheric pressure; however, subatmospheric and superatmospheric pressures may be employed, the preferred pressure being about 0.1 to about 0.4 atmosphere where a relatively low boiling solvent is also employed.

When the dimerization is carried out at 25 to 40° C., a time of 1 to 5 hours is necessary to complete the reaction. Under the preferred conditions, longer times do not appreciably effect the yields.

Good results are obtained when about 0.03 to about 5.0% by weight of imidazole with respect to diketene and a solvent is employed. A more preferred amount of catalyst is about 0.1 to about 1% by weight. More catalyst, although less economical, can be used; less catalyst requires a longer reaction time.

The following non-limiting examples are given as illustrations of certain specific embodiments of the invention.

EXAMPLE 1

Diketene (186 g., purity 99%) is added dropwise to a mixture of toluene (300 ml.) and 1-methylimidazole (1.0 g.) at 25° C. over a period of about 2 hours. After all the diketene has been added, the reaction mixture is stirred for 30 min. longer. The mixture is then cooled to 0° C. and filtered. The separated product is washed with 200 ml. of chilled toluene (0° C.); and then air-dried. The weight is 137 g., M.P. 110–11° C.

Concentration of the mother-liquor and the toluene wash give additional product (9.3 g.), M.P. 108–110° C. The combined yield is 79% based on diketene.

The process of Example 1 is repeated using trimethylamine (1.0 g.) as a catalyst, the reaction conditions and recovery procedure being otherwise the same. The first crop yield of dehydroacetic acid obtained is 76%, M.P. 108–111° C. The product, when converted into sodium dehydroacetate gives an orange colored salt. The sodium salt of the dehydroacetic acid obtained using trimethylamine as a catalyst may be used as an illustration to indicate the amount of impurities formed.

The dehydroacetic acid prepared according to the method of the present invention when dissolved in 8 milliliters of a solution of 10 grams of sodium hydroxide in 100 milliliters of pure redistilled absolute ethanol and stirred for 10 to 15 minutes until a salt is formed, yielded a white to cream-white sodium salt.

The above example illustrates that by employing the process of the present invention a substantially purer dehydroacetic acid is obtained as compared to the dimerization of diketene in the presence of trimethylamine as a catalyst.

EXAMPLE 2

Under the same conditions as described in Example 1, when diketene (179 g., 95% purity) is added to a mixture of toluene (300 ml.) and 1-ethylimidazole (1.0 g.), 113 g. (66%) of a first crop dehydroacetic acid, M.P. 109–111° C., is obtained.

EXAMPLE 3

Under similar conditions as in Example 1, when diketene (179 g., 95% purity) is added to a mixture containing 1-octylimidazole (2.0 g.) in toluene (300 ml.), 114 g. (66%) of a first crop dehydroacetic acid, M.P. 109–111° C., is obtained.

It may be seen by comparison of Example 3 with Examples 1 and 2 that as the alkyl group $R_1$ of Formula III increases in molecular weight the catalytic activity of the imidazole for the reaction decreases slightly and consequently an increased amount of catalyst, as employed in Example 3, has to be used in order to obtain comparable conversions. The sodium salts of Examples 2 and 3 also were prepared according to the method of Example 1 and white to cream-white colored sodium salts of dehydroacetic acid are obtained.

EXAMPLE 4

Under the same conditions as in Example 1, when diketene (179 g., 96% purity) is added to a mixture of toluene (300 ml.) and 1,2-dimethylimidazole (1 g.), 85 g. (49%) of a first crop dehydroacetic acid, M.P. 108.5–111° C., is obtained.

EXAMPLE 5

Under the same conditions as in Example 1, when diketene (179 g., 96.7% purity) is added to a mixture of toluene (300 ml.) and 1,2-diethyl-4-methylimidazole (2 g.), 62 g. (37%) of a first crop dehydroacetic acid, M.P. 108–111° C., is obtained.

Both Examples 4 and 5 when compared to Example 1 also illustrate that 2 and 4 substitution of the imidazole by an alkyl group results in reducing the catalytic activity of the compound. The preferred substituent in these positions is therefore hydrogen. The sodium salt of the dehydroacetic acid obtained from Examples 4 and 5 was prepared according to the method of Example 1 and white to cream-white salts were obtained indicating a compound having high purity.

EXAMPLE 6

The process of Example 1 is repeated using 4 g. of 1-methylimidazole, the reaction conditions and recovery procedure being otherwise the same. The combined yield of dehydroacetic acid M.P. 108–110° C. is 85% based on diketene.

The dehydroacetic acid obtained according to the method of Example 6 is converted into its sodium salt according to the method of Example 1 and a white to cream-white salt is obtained.

EXAMPLE 7

The process of Example 1 is repeated by adding diketene (179 g., 95% pure) to a mixture of 1-methylimidazole (1.0 g.) and toluene (300 ml.), and a 66% yield of a first crop dehydroacetic acid is obtained. After recovering the dehydroacetic acid, the residual liquid (250 ml.), consisting mostly of toluene and unrecovered dehydroacetic acid, is recycled to the reactor together with 50 ml. of fresh toluene containing 0.6 g. of 1-methylimidazole. A further amount of diketene (179 g. 95% purity) is then added over a period of about 2 hours, maintaining the temperature at 20 to 25° C. during the addition.

Dehydroacetic acid is recovered as before and the residual liquid is recycled to the reactor again with the same of fresh solvent and catalyst; further amounts of diketene are then added under the same conditions. This process is repeated 7 times. A total yield of 71% is obtained. The product from each run, when converted into sodium dehydroacetate, yields a creamy white colored sodium salt.

The process of Example 7 is carried out with trimethylamine (1 g.) as catalyst. The mother-liquor obtained from the first run with trimethylamine is used once again. The overall yield of dehydrodacetic acid is 76%. The product, when converted into sodium dehydroacetate however gave an organe colored salt.

The method of Example 7 illustrates that the mother-liquid obtained from a first run production of dehydroacetic acid may be recycled to the reaction mass along with added diketene and catalyst without affecting the purity of the subsequent runs of dehydroacetic acid. This is attributable to the fact that high purity dehydroacetic acid is obtained, i.e. the quantity of impurities produced employing the catalyst of the present invention is minimized; consequently, recycling the mother-liquor does not result in building up or concentrating the impurities in the reaction mass.

EXAMPLE 8

Under similar conditions as described in Example 1 diketene (179 g., 95.5% purity) is added to a mixture of 1-methylimidazole (1.0 g.) and a binary solvent (300 ml.) consisting of 50% of acetone and 50% of hexane by weight. After filtration, the solid is washed with 200 ml. of the same solvent mixture chilled to 0° C. One hundred forty grams (140 g., 81.5%) of a first crop dehydroacetic acid, M.P. 109–110° C., is obtained.

Concentration of the mother-liquor to dryness gives 43 g. of residue, which, upon recrystallization from methanol yields (10.8 g.) dehydroacetic acid, M.P. 108–110° C. The combined yield is 88% based on diketene.

Example 8 is similar to Example 7, however, the mother-liquor is not recycled but subsequently treated to obtain second crop crystals of dehydroacetic acid so as to improve the recovery. The dehydroacetic acid obtained is converted into its sodium salt according to method of Example 1 and a white to cream-white salt is obtained thus illustrating as in Example 7 that impurities are produced in either negligible quantities or not at all and are not carried over to any great extent in the mother-liquor when a second crop yield of crystals is obtained. Example 8 also illustrates the effect of the acetone-hexane solvent on the reaction to increase the yields of dehydroacetic acid.

EXAMPLE 9

The method of Example 8 is repeated substituting for the solvent a 40:60 (weight basis) acetone:toluene mixture and a first crop of dehydroacetic acid is obtained in 67% yield.

EXAMPLE 10

The method of Example 8 is repeated, however, 1-isopropyl-imidazole is substituted for the 1-methylimidazole, and a first crop of dehydroacetic acid is obtained in 80% yield.

EXAMPLE 11

The method of Example 2 is repeated substituting 1-n-propylimidazole for the 1-ethylimidazole and substantially the same results are obtained.

EXAMPLE 12

The method of Example 3 is repeated substituting 1-sec-butylimidazole for the 1-octylimidazole and substantially the same results are obtained.

EXAMPLE 13

Procedure: 1-methylimidazole (2.0 g.) is dissolved in 18 g. of water. Diketene (175 g., 96.7% pure) is added slowly at 20–30° C. over a period of about 3 hours. After the addition is completed, the reaction mixture is kept at 30–60° C. for several hours longer until carbon dioxide ceases to evolve. Any low-boiling products formed are removed on a rotary evaporator at 25° C./2 mm. Gas chromatographic analyses indicate that the reaction mixture contains 95.0 g. of diacetylacetone (2,4,6-heptanetrione) in a 67% yield, and 7.3 g. of 2,6 - dimethyl-4-pyranone in a 5.9% yield.

EXAMPLE 14

Example 13 is repeated using 1-ethylimidazole as a catalyst and substantially the same results are obtained.

EXAMPLE 15

Example 13 is repeated using 1,2-diethyl-4-methyl imidazole as a catalyst; again, diacetylacetone and dimethylpyranone are identified as products of the reaction.

EXAMPLE 16

Example 13 is repeated using 1-propylimidazole as a catalyst and substantially the same results obtained.

When the other imidazoles specifically enumerated herein are employed according to the methods of Examples 1, 13, 7 and 8, substantially the same results are obtained. By employing the various reactants, solvents and dimerization conditions noted above substantially the same results are obtained as in the foregoing examples in which imidazole catalysts are used.

The dehydroacetic acid obtained has utility as an intermediate in biologically active compounds and products. Other utilities are given in U.S. Pats. 3,246,001 and 3,206,253. The 2,4,6-heptanetrione may be used to manufacture the tetramers and pentamers previously noted, by reaction with an amine and diketene. The tetramers and pentamers may be used as indicators in acid base reactions. The 2,6-dimethylpyranone has biological activity and may be used in antifungus and antibacterial applications.

Although the invention has been described by reference to one or more embodiments it is not intended that the broad scope of the novel catalyst comprising imidazoles, especially 1-alkylimidazoles and the method for converting diketene to dehydroacetic acid or 2,6-dimethylpyranone or 2,4,6-heptanetrione in the presence of such catalysts be limited thereby, but that some modifications are intended to be included within the spirit and the broad scope of the following claims.

What is claimed is:

1. A method for the manufacture of dehydroacetic acid comprising dimerizing diketene in the presence of an imidazole of the structure:

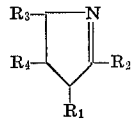

where $R_1$ is a one to about 8 carbon atom alkyl or alkoxyalkyl, $R_2$, $R_3$, and $R_4$ are selected from a member of the group consisting of hydrogen and $R_1$ at from about 0 to about 50° C.

2. The method of claim 1 where said imidazole comprises 1-methylimidazole.

3. The method of claim 1 where said imidazole comprises 1-ethylimidazole.

4. The method of claim 1 where said imidazole comprises 1-octylimidazole.

5. The method of claim 1 where said imidazole comprises 1,2-dimethylimidazole.

6. The method of claim 1 where said imidazole comprises 1,2-diethyl-4-methylimidazole.

7. The method of claim 1 where said imidazole comprises 1-propylimidazole.

8. The method of claim 1 where said imidazole comprises 1-butylimidazole.

9. The method of claim 1 where said reaction is conducted in the presence of a solvent comprising about 30 to about 60 parts by weight of a ketone having from 3 to about 10 carbon atoms and about 70 to about 40 parts by weight of a normally liquid hydrocarbon having from about 5 to about 10 carbon atoms.

10. The method of claim 1 where said reaction is conducted in the presence of acetone and hexane.

11. The method of claim 10 where said reaction is conducted in the presence of acetone and toluene.

12. The method of claim 1 where said dimerization is conducted continuously in a solvent by separating dehydroacetic acid from said solvent and recycling said solvent to said diketene and said catalyst and continuously replenishing said diketene and said catalyst at a rate commensurate with the formation of said dehydroacetic acid, and depletion of said catalyst.

13. The method of claim 1 where said dimerization is conducted in a solvent and said dehydroacetic acid is separated therefrom by crystallization and recrystallization.

References Cited

UNITED STATES PATENTS

| | | | |
|---|---|---|---|
| 2,229,204 | 1/1941 | Boese | 260—343.5 |
| 2,729,652 | 1/1956 | Nordt | 260—343.5 |
| 3,173,954 | 3/1965 | Clark | 260—343.5 |

ALEX MAZEL, Primary Examiner

A. M. T. TIGHE, Assistant Examiner

U.S. Cl. X.R.

260—309, 343.2, 479, 526, 592, 595, 999

UNITED STATES PATENT OFFICE
CERTIFICATE OF CORRECTION

Patent No. 3,592,826  Dated July 13, 1971

Inventor(s) E. Marcus, et al

It is certified that error appears in the above-identified patent and that said Letters Patent are hereby corrected as shown below:

In claim 1, change the structural formula to read as follows:

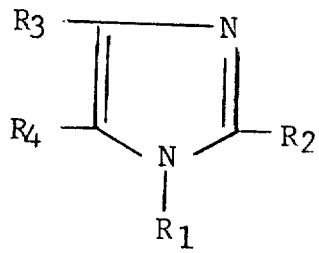

Signed and sealed this 28th day of November 1972.

(SEAL)
Attest:

EDWARD M. FLETCHER, JR.
Attesting Officer

ROBERT GOTTSCHALK
Commissioner of Patents